March 16, 1937.   A. LOWENFELS   2,073,844
MONOGRAM FOR AUTOMOBILES
Filed March 6, 1936

Inventor
Albert Lowenfels
By:- Cox & Moore attys.

Patented Mar. 16, 1937

2,073,844

UNITED STATES PATENT OFFICE 2,073,844

MONOGRAM FOR AUTOMOBILES

Albert Lowenfels, White Plains, N. Y.

Application March 6, 1936, Serial No. 67,447

4 Claims. (Cl. 41—33)

This invention relates to decalcomanias, and particularly to a decalcomania monogram and the method of preparing and applying it.

One object of the invention is the provision of a monogram decalcomania by means of which any desired monogram on a selected background may be applied to a surface, the background and the monogram thereon being handled as a unit.

Another object of the invention is the provision of a decalcomania comprising a background with selected initials applied thereover as may be desired, which may be handled as a unit to apply both the background and the initials to a surface.

Still another object of the invention is the provision of a method of making a monogram decalcomania by which a decalcomania background is provided at will with selected initials and the whole device adapted for applying as a unit to a surface to show the selected initials superimposed on the background.

These objects and other objects which will hereinafter appear are obtained by the novel and useful combination, construction and arrangement of elements and the novel and useful process herein disclosed.

A monogram decalcomania embodying the present invention, and graphic illustrations of the method of the present invention, are shown in the accompanying single sheet of drawing hereby made a part of this specification in which—

Figure 3:
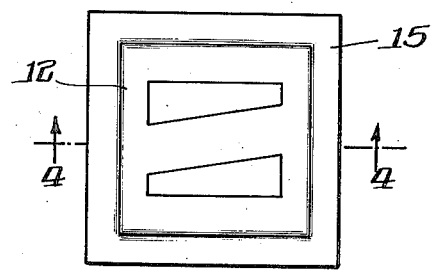
Figure 3 is a face view of a background decalcomania prepared in accordance with the invention herein disclosed.
Figure 4:
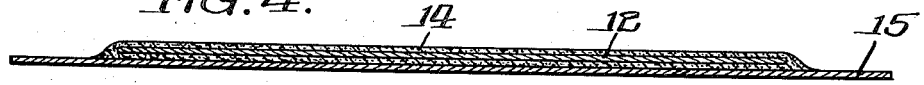
Figure 4 is a cross section of the background decalcomania of Figure 3 on line 4—4 of Figure 3.
Figure 5:
Figure 5 is a face view of three decalcomania initials prepared according to the invention herein disclosed for application to the background shown in Figure 3.
Figure 6:
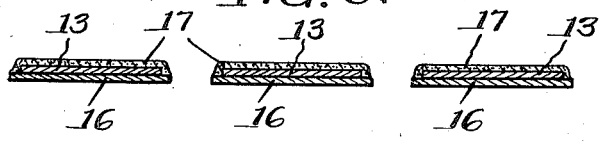
Figure 7:
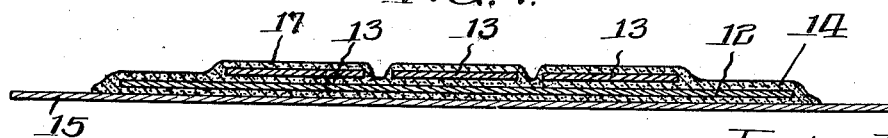

Figure 6 is a cross section through the three initials of Figure 5 on line 6—6 of Figure 5; and Figure 7 is a cross section of a finished decalcomania monogram made in accordance with the present invention, the illustration comprising a composite view of the devices of Figures 4 and 6 on lines 4—4 of Figure 3, and 6—6 of Figure 5.

A decalcomania ordinarily consists of a sheet of pigment embodied in a holding medium, as for instance a lacquer, coated on both sides with an adhesive, and pigment and adhesive secured to a sheet of paper or the like, whereby the paper may be moistened and the sheet of pigment and the adhesive slid therefrom onto a selected surface.

In the present invention the monogram decalcomania consists generally of a unitary background decalcomania over which is applied one or more smaller unitary decalcomanias, which may comprise initials or other indicia, the resulting decalcomania being adapted to be slid from the paper backing as a unit and applied to a surface to present the appearance of the initials or other indicia superimposed on a background.

Figure 1:
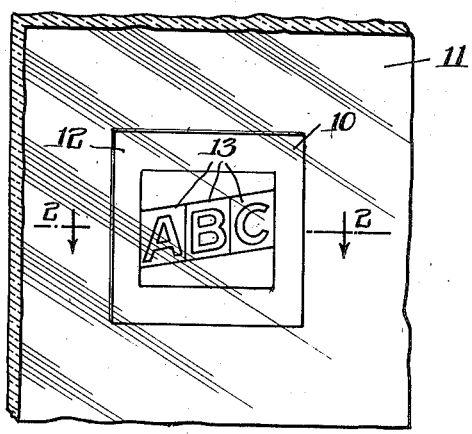
Figure 1 is a face view of a background and monogram decalcomania embodying the present invention, applied to a surface.

In Figure 1 an improved decalcomania 10 embodying the present invention is shown secured to a surface 11, which may be the back face of a sheet of glass, the decalcomania being seen through the glass, as shown, or may be the face of an opaque object. The decalcomania 10 comprises a background portion 12, and initials or other indicia 13. The decalcomania 10 is applied to the surface 11 by means of adhesive 14.

Figure 2:
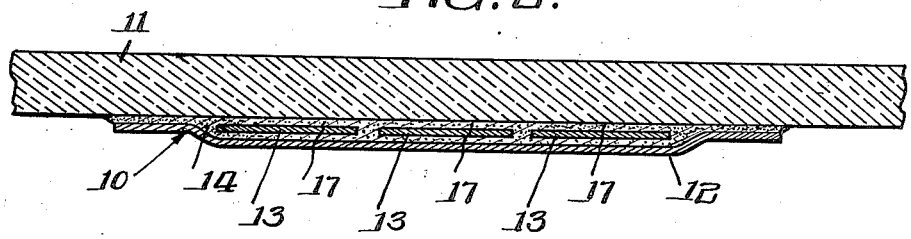
Figure 2 is a cross section on line 2—2 of Figure 1.

In preparing the monogram decalcomania as herein disclosed, the background portion 12 is first secured to the backing sheet 15. The adhesive 14 is on both faces of the portion 12. Next the selected initials 13 as illustrated in Figures 5 and 6 are cut to a size and shape adapted to fit in the proper position over the background 12. They are then fitted into the proper place on the background 12 and carefully aligned to present an attractive appearance. Originally the initials 13 consist of sheets of pigment on paper backings 16 and covered by adhesive 17. The adhesive may be applied to both faces of the initials 13 but need be only over the front face as shown. The pigment 15 and adhesive 17 is slid from the backer 16 into proper position on the background, the paper backer 16 of the initials not being applied to the background. The backs of the initial decalcomanias 13 from which the backers 16 are removed are applied to the face of the background decalcomania 12 with the fronts of the initials and the adhesive 17 on the initials facing toward the front of the background decalcomania. The resulting composite decalcomania is shown in Figure 7. The paper 15, originally the backer for the background portion, comprises the backer for the composite decalcomania. Over this is secured the background pigment 12, then the adhesive 14 over the background pigment, next the initial pigments 13, and finally the adhesive 17 over the initial pigments. When the decalcomania shown in Figure 7 is moistened and applied to the surface 11 and the result is as shown in Figure 2, adhesive 14 and adhesive 17 coalescing to form a continuous attachment for the entire composite decalcomania to the surface 11. When the composite decalcomania is applied to an opaque surface the back of the decalcomania is against the surface.

Where the decalcomania is applied to a surface much exposed to the weather or to moisture it is found advisable to apply a coating of varnish or clear lacquer or the like over the decalcomania when the adhesive has completely dried.

By the term "unitary decalcomania" as employed in the specification and claims is meant a decalcomania initially capable of existing as such by itself. As recited above, a decalcomania normally comprises a pigment design supported in a holding medium, such as a layer of lacquer or the like, and being provided with an adhesive coating. According to the present invention, the background decalcomania and the indicia decalcomania each is originally complete and unitary in itself and the latter is capable of being transferred in the conventional manner of a decalcomania to the background unit.

The particular monogram decalcomania herein disclosed is but one of many possible embodiments of the invention, and it is intended that the invention be not limited to the single embodiment shown but only by the appended claims.

What is claimed as new and is desired to be secured by Letters Patent of the United States is:

1. A monogram comprising a unitary background decalcomania, and a second unitary initial decalcomania superimposed on the background decalcomania and maintained adhesively in place.

2. A composite decalcomania comprising a unitary background decalcomania, and a distinct indicia layer comprising a unitary decalcomania of less extent than the background layer superimposed on the background layer and held thereon by a layer of adhesive, said decalcomania being adapted for application to a surface as a unit with the indicia layer showing in front of the background layer.

3. A composite decalcomania comprising a unitary decalcomania layer embodying a background design, said layer being formed primarily of suitable pigments supported in a lacquer film, said layer being embedded in a film of adhesive, a plurality of smaller unitary decalcomania layers also embodying ornamental designs lying substantially on one surface of the adhesive film, and maintained in place by said adhesive, and a second film of adhesive covering the free surfaces and free edges of said second named layers.

4. A composite decalcomania comprising a base of porous paper, a layer of adhesive upon one surface of said paper, a unitary decalcomania containing a pigmentary design and embedded within the adhesive layer, a second unitary decalcomania containing a second pigmentary design above the first pigment-containing layer, said second layer lying substantially on the surface of said adhesive film, and a second adhesive film overlying and surrounding said second named layer.

ALBERT LOWENFELS.